T. RYAN.
AUTOMATIC HOSE AND FABRIC CUTTING ATTACHMENT FOR KNITTING MACHINES.
APPLICATION FILED JULY 22, 1912.
1,056,589.
Patented Mar. 18, 1913.
3 SHEETS—SHEET 1.
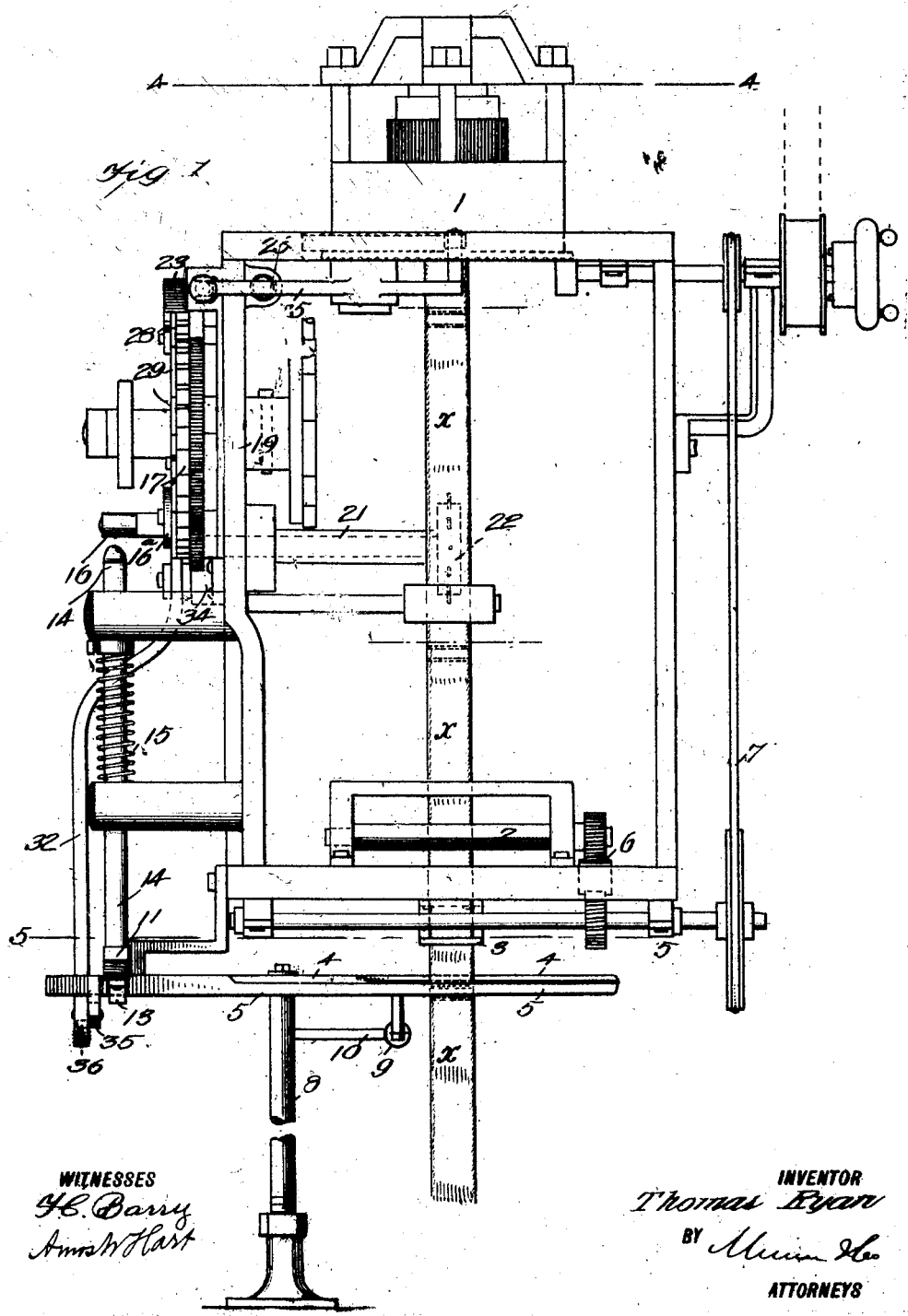

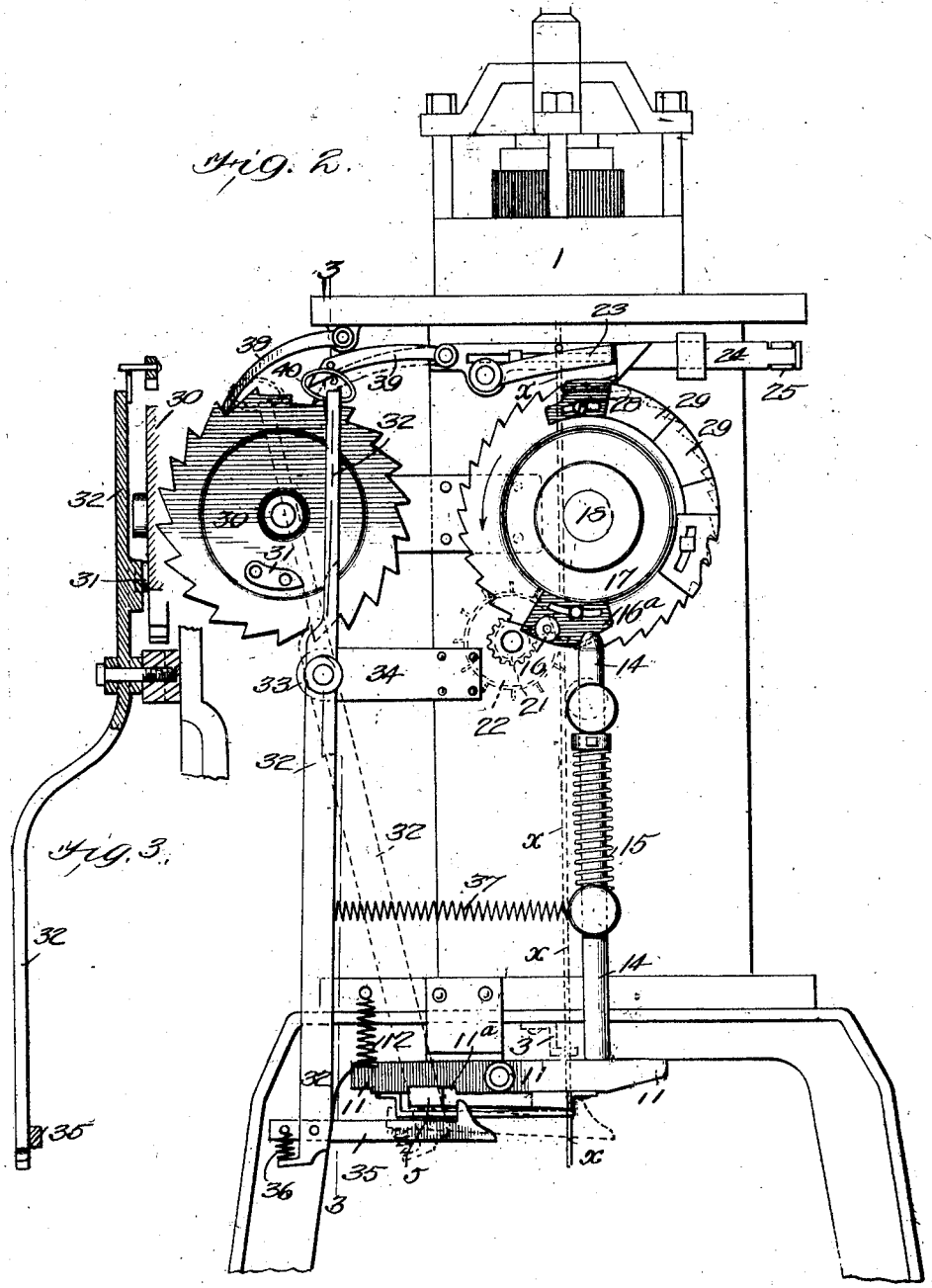

T. RYAN.
AUTOMATIC HOSE AND FABRIC CUTTING ATTACHMENT FOR KNITTING MACHINES.
APPLICATION FILED JULY 22, 1912.

1,056,589.

Patented Mar. 18, 1913.

3 SHEETS—SHEET 3.

WITNESSES

INVENTOR
Thomas Ryan
BY
ATTORNEYS

UNITED STATES PATENT OFFICE.

THOMAS RYAN, OF PHILADELPHIA, PENNSYLVANIA.

AUTOMATIC HOSE AND FABRIC CUTTING ATTACHMENT FOR KNITTING-MACHINES.

1,056,589.  Specification of Letters Patent.  Patented Mar. 18, 1913.

Application filed July 22, 1912. Serial No. 710,879.

*To all whom it may concern:*

Be it known that I, THOMAS RYAN, a citizen of the United States, and a resident of Philadelphia, in the county of Philadelphia and State of Pennsylvania, have invented an Automatic Hose and Fabric Cutting Attachment for Knitting-Machines, of which the following is a specification.

My attachment comprises cutting mechanism, preferably in the form of scissors or shears, which is automatically operated to sever rib hose or other fabric as produced by a knitting-machine, thus dividing the product into desired lengths or sections. The attachment is applied and supported in pendent position on one side of the frame of the knitting machine. The automatic and intermittent operation of the cutting mechanism is preferably effected by the hose or fabric itself as fed or pulled down from the needles, the same acting on a toothed wheel whose shaft coöperates directly with the automatic devices for alternately setting and tripping the cutting mechanism proper.

In the accompanying drawings I show one form of the embodiment of my invention.

Figure 4:
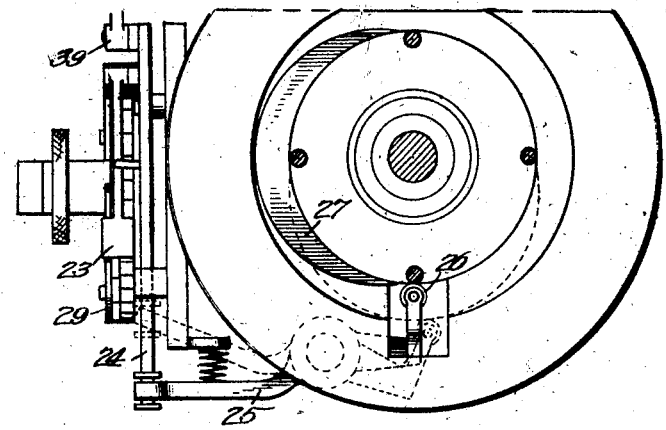
Figure 5:
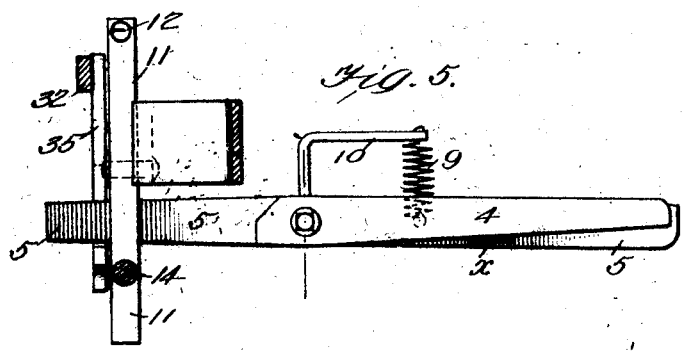
Figure 6:
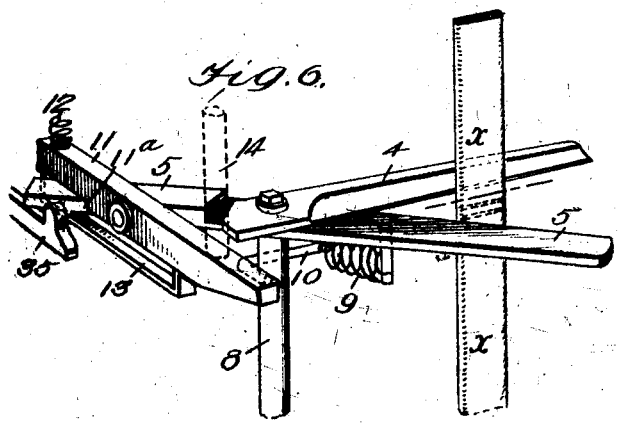
Figure 7:
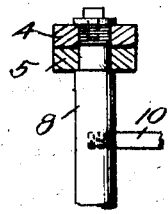

Figure 1 is a side view showing my invention applied to a knitting machine. Fig. 2 is another side view taken at right angles to that shown in Fig. 1. Fig. 3 is a vertical section on the line 3—3 of Fig. 2. Fig. 4 is a horizontal section on the line 4—4 of Fig. 1. Fig. 5 is a horizontal section on the line 5—5 of Fig. 1 the same being taken just above the scissors or shears. Fig. 6 is a perspective view illustrating the cutting mechanism set in position to operate. Fig. 7 is a detail section showing the cutters or scissors blades attached to a vertical support.

In Figs. 1 and 2, the numeral 1 indicates the box of a knitting machine containing a cam for operating the needles in the usual way. The hose or other fabric knitted is shown depending from the box at $x$ and passing between take-up rollers 2 and then through a guide loop 3 which is located adjacent to the scissors blades 4 and 5. The rollers 2 are operated in opposite directions so as to feed the hose or fabric $x$ downward and they are operated through gear-and belt-connections 6 and 7 with the driving shaft of the knitting-machine.

As shown in Figs. 1, 5, 6 and 7, the shorter scissors blade 4 is fixed and the longer scissors blade 5 is pivoted on a vertical post 8. A helical retracting spring 9 is attached at its respective ends to the movable scissors blade 5 and a short rod 10 forming a fixed attachment of the post 8. Said spring thus acts through its normal contraction to close the scissors blades when the movable one is left free. The movable blade is opened by mechanism which will be presently described, and it is locked or held normally, but detachably, in the open position by means of a latch, which is best illustrated in Fig. 6. Said latch is a bar 11 arranged practically horizontally and pivoted on a fixed support. A helical spring 12—see Fig. 2—bears on one end of the latch 11 and serves to hold its shoulder 11$^a$ normally engaged with the shank of the movable blade 5. The latter has on its under side an elongated metal loop 13 which serves to prevent the latch from being thrown too far when tripped by means of the rod 14—see Figs. 1 and 2. This rod is arranged in vertical guides and encircled by a helical spring 15 which serves to retract it after depression which is effected through the medium of a roller or cam 16 which is attached to a so-called pattern wheel 17 and is adapted at each rotation of the latter to come in contact with the rounded upper end of the trip rod 14 and thus depress the same sufficiently to bear down the end of the latch 11 on which it rests, thus releasing the scissors blade 5 and allowing the spring 9 to close the blades with sufficient force to sever the fabric $x$.

The roller 16 projects laterally from a plate 16$^a$—see Fig. 2—which is provided with an arc slot and secured to the body of the wheel 17 by means of a bolt which permits adjustment of the roller or cam as conditions may require. The pattern wheel 17 is the outer one of three wheels which are mounted on a horizontal shaft 18, and said wheel is carried around by friction with the middle one 19 which, as shown in Fig. 1, is constructed as a gear and meshes with a pinion 20 keyed on a horizontal shaft 21 on whose inner end is mounted a wheel 22 having small peripheral teeth or pins which enter the fabric $x$. It will be seen that as the fabric is pulled downward by the rollers 2, the pin-wheel 22 is rotated and thereby motion is imparted to the pattern wheel 17.

It is apparent that at the time the roller or cam 16 on the pattern wheel 17 comes in contact with the trip rod 14, extra power is required to cause the roller to override and depress said rod which is required for automatically releasing the latch 11 from the shank of the movable scissors blade 5. To aid in rotation of the pattern wheel at this time, I employ a hook pawl 23 which is pivoted to a horizontal reciprocating bar 24—see Figs. 2 and 4. Said bar is reciprocated by means of a pivoted spring lever 25 whose angular end carries a roller 26 that works in contact with a cam 27.

The hook 23 is adapted to engage an extra tooth 28 which is attached to the periphery of the pattern wheel 17. It is obvious that this tooth 28 must be arranged practically diametrically opposite the roller or cam 16. The point or tooth 28 projects beyond the ordinary ratchet teeth of the pattern wheel 17, and it will be noted that on the right side of such tooth 28, the pattern wheel is provided with plates 29 whose edges project beyond the teeth of the wheel and thus hold the pawl of the pattern wheel out of operation when desired.

The pattern wheel and the two others with which it is operatively connected constitute what is called a "clock." The purpose of the whole clock arrangement is to provide for making a welt and slack course in the hose or fabric and the length of the rib top or stocking legs depends on how many teeth in the ratchet wheel are covered by idlers. That is to say, if it be desired to make them longer, an extra idler is put on which holds the clock back until a longer fabric has been knit. One revolution of the clock provides for one welt and slack course. When the pattern wheel 17 is operated by the pawl, every revolution of the knitting machine carries the wheel forward one tooth, and if there were no idlers on the wheel, a succession of welts and slack course would be made; but when the pawl or hook is thrown out of action by the idlers, the machine keeps on knitting the leg or top of the stocking until the idlers have passed under the pawl and the latter then engages the teeth and starts the welt and slack course mechanism which completes its work by the time the pattern wheel has been rotated around to the point where the idlers put the pawl out of action. The machine then goes on knitting another piece of fabric or stocking leg by which time the idlers have passed under the pawl, whereupon the operation is repeated.

A ratchet wheel 30 is arranged on the left of the pattern wheel 17 and is provided with a lateral cam 31 which is adapted to come in contact at each revolution of said wheel with the shorter arm of a long lever 32 pivoted at 33 on a bracket 34 forming a fixed attachment of the knitting machine frame. To the lower end of such lever is pivoted a hook pawl 35 whose free end is adapted to engage the shank of the movable scissors blade 5.

A contractile spring 36 is applied to the lever 32 and hook 35 in such manner as to hold the free end of the hook raised or in such position as to normally engage the shank of the scissors blade 5. A retracted spring 37 is applied to the lower and longer arm of the lever 32, thus tending normally to hold it in the position indicated by dotted lines in Fig. 2. Let it be supposed now that the latch 11 has been tripped by the rod 14 and the movable scissors blade 5 thereby released so that through the contraction of the spring 9 attached to said blade, the scissors have been closed and thus caused to sever a length of the hose or fabric $x$. At this time the cam 31 on the ratchet wheel 30 comes in contact with the lever 32 which is then in the position indicated by dotted lines in Fig. 2. As the wheel 30 continues to rotate, the cam presses the lever back until it comes to the position indicated by dotted lines in Fig. 2, in which operation its hook 35 being engaged with the shank of the movable blade 5, pulls the latter into the position indicated in Fig. 6, where it automatically locks with the shoulder $11^a$ of the pivoted latch 11. So soon as this resetting of the scissors blade 5 has occurred, the cam 31 passes out of contact with the lever 32 and the latter is then left free to swing back to the normal position indicated by dotted lines in Fig. 2, which, as before intimated, is effected through the contraction of the spiral spring 37. It will thus be understood that at each rotation of the ratchet wheel 30, the cam acts once on the lever 32 to retract and set the movable blade of the scissors, this being effected by drawing such blade into the position indicated in Fig. 6, where its shank engages the shoulder $11^a$ of the latch 11. To sum up the matter, at each rotation of the pattern wheel 17, there is a corresponding rotation of the ratchet wheel 30 and the operations of tripping the latch 11 to release the scissors and the re-setting of the latter are effected in quick succession.

A locking pawl 38—see Fig. 2—is pivoted to the frame of the knitting machine and its free end rides on the teeth of the ratchet. A push pawl 39 is also pivoted to the reciprocating bar 24 and serves to rotate the ratchet wheel 30 by intermittent engagement with its respective teeth. It will be noted, however, that at one point in its periphery, the ratchet wheel 30 is mutilated or unprovided with teeth of the usual length, and the upper end of the long lever 32 is provided with a cam 40 which acts against a pin projecting laterally from the push pawl 39, so that when the lever is in the position indicated by full lines, the pawl 39 is held out of contact with the wheel 30. The cam 40 may be constructed of wire in the form of an oval. This wire cam 40 only raises the pawl 39 sufficiently to keep it out of action at the point where the teeth on the ratchet wheel 30 are cut down so that such portion of the wheel constitutes practically an idler. Consequently after the cam 31 has pushed the lever 32 back into vertical position and thus re-set the scissors, the pawl 39 keeps on actuating the ratchet wheel and racking it around, until rendered inoperative by the cut-down portion of said wheel 30, when the cam 31 is in the correct position for the next operation.

What I claim is:—

1. In a cutting attachment for a knitting machine, the combination with scissor-like cutting mechanism which includes a pivoted blade and a fixed blade arranged together horizontally, a spring for retracting the pivoted blade, mechanism for setting such blade and locking it in the open position, and means for tripping the locking mechanism, as described.

2. In an attachment for the purpose specified, the combination with means for drawing a fabric, of a rotatable wheel having a peripheral cam, cutting mechanism arranged horizontally below the cam wheel and consisting of scissor-blades, one of which is pivoted, a retracting spring connected with such blade, a pivoted latch for holding the pivoted blade in the open position, and a vertical trip rod adapted to act on the latch and release the same from the movable blade when acted on by the aforesaid cam wheel, as describd.

3. In an attachment for the purpose specified, the combination of a so-called pattern wheel provided with a cam and a projecting tooth arranged on the opposite side, a reciprocating hook pawl adapted to engage such tooth, a trip rod upon which the cam is adapted to operate, a pivoted latch actuated by the trip rod, cutting mechanism including a pivoted blade with which such latch engages, and means for automatically re-setting the movable blade after the same has been released by the latch as described.

4. An attachment for the purpose specified, comprising a rotatable wheel having a cam, a spring retracted trip rod upon which the cam is adapted to actuate, a pivoted latch actuated by the trip rod, a cutter with which the latch is adapted to engage for holding it normally out of action, means for automatically re-setting the movable blade, the same comprising a pivoted lever having a hook for engaging the shank of the blade, a spring normally retracting said lever, a wheel provided with a cam adapted to act on the upper arm of the lever for causing it to draw the movable blade back into the normal or set position, and means for automatically rotating the cam wheel, as described.

THOMAS RYAN.

Witnesses:
 IDA W. HALL,
 WM. M. FRANCE.